No. 735,409. PATENTED AUG. 4, 1903.
P. PEDERSEN.
INCUBATOR.
APPLICATION FILED JUNE 13, 1902.
NO MODEL. 3 SHEETS—SHEET 1.

WITNESSES:
INVENTOR
Peder Pedersen
BY
A. V. Groupy
ATTORNEY.

No. 735,409. PATENTED AUG. 4, 1903.
P. PEDERSEN.
INCUBATOR.
APPLICATION FILED JUNE 13, 1902.
NO MODEL. 3 SHEETS—SHEET 2.

WITNESSES:
F. H. Gamble.
H. W. Canby.

INVENTOR
Peder Pedersen
BY
A. V. Groupy
ATTORNEY.

No. 735,409. PATENTED AUG. 4, 1903.
P. PEDERSEN.
INCUBATOR.
APPLICATION FILED JUNE 13, 1902.
NO MODEL. 3 SHEETS—SHEET 3.
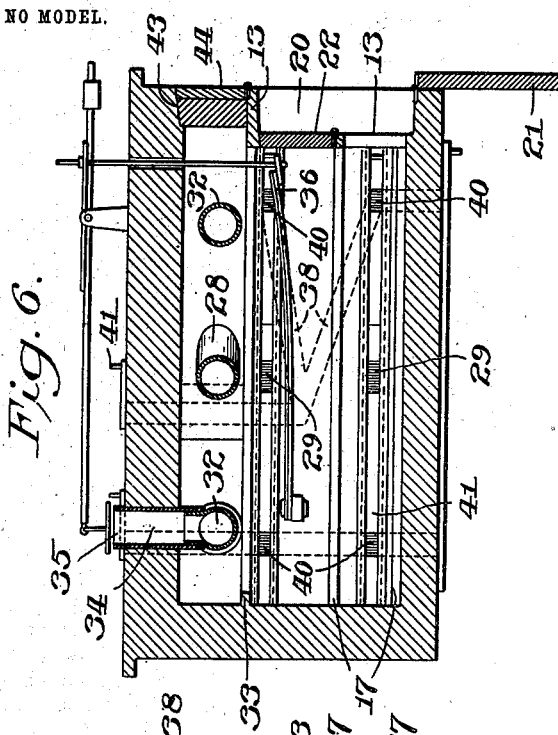
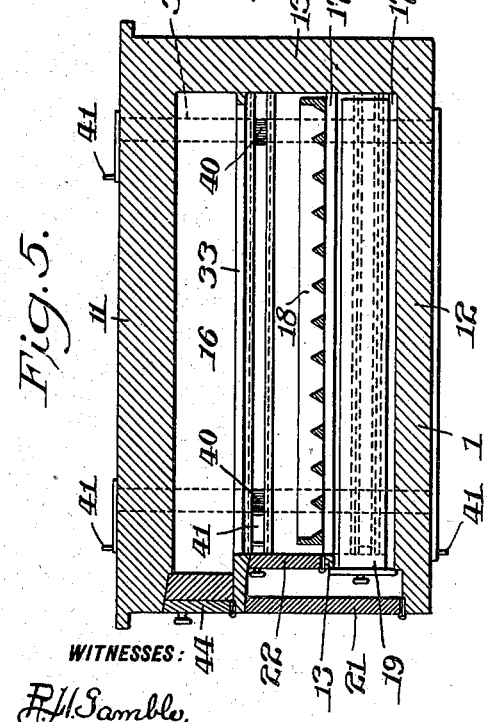
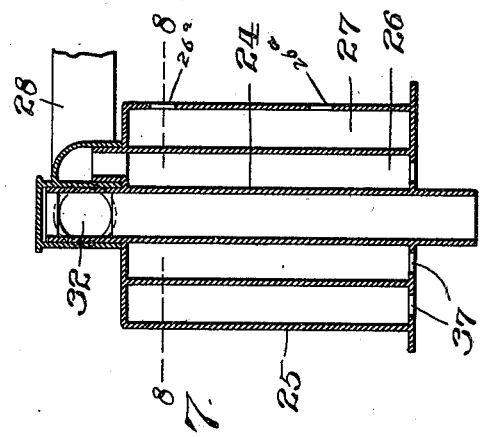
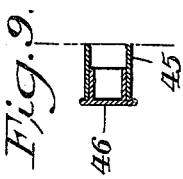
WITNESSES:
F.W.Gamble.
N.W.Canby.
INVENTOR
Peder Pedersen
BY
A.V. Groupe
ATTORNEY.

No. 735,409. Patented August 4, 1903.

UNITED STATES PATENT OFFICE.

PEDER PEDERSEN, OF BAKERSVILLE, NEW JERSEY.

INCUBATOR.

SPECIFICATION forming part of Letters Patent No. 735,409, dated August 4, 1903.

Application filed June 13, 1902. Serial No. 111,463. (No model.)

*To all whom it may concern:*

Be it known that I, PEDER PEDERSEN, a citizen of the United States, residing at Bakersville, in the county of Atlantic and State of New Jersey, have invented certain new and useful Improvements in Incubators, of which the following is a specification.

This invention relates to incubators, and has for its object to provide a simple and efficient construction whereby access may be readily had to various parts thereof, whereby a uniform temperature may be maintained throughout the incubating-chamber, and whereby proper ventilation of the interior of the apparatus may be secured.

With this object in view my invention comprises various novel features of construction and combinations of parts which will be hereinafter fully described and claimed.

Figure 1:
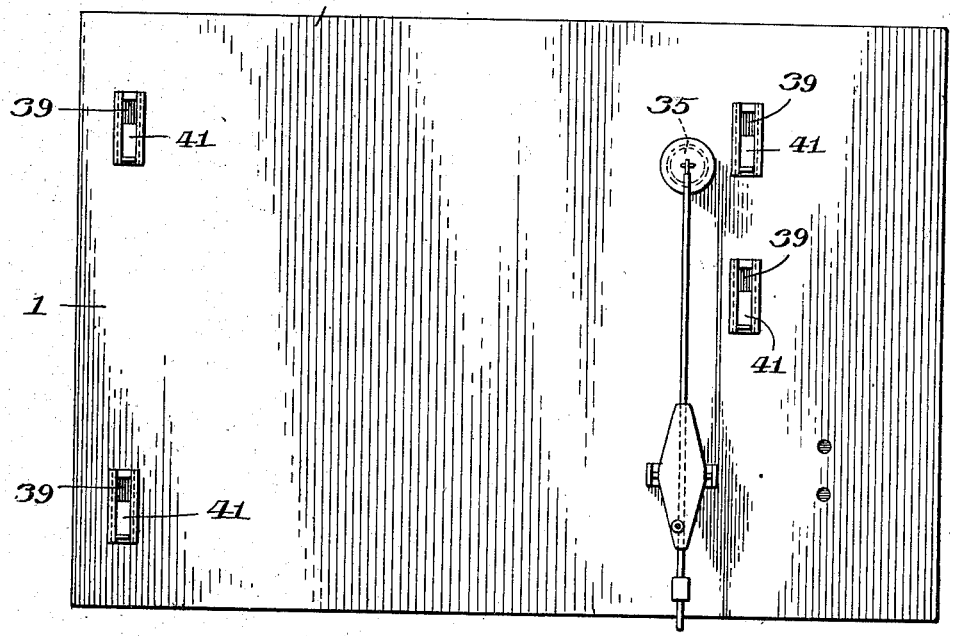
Figure 2:
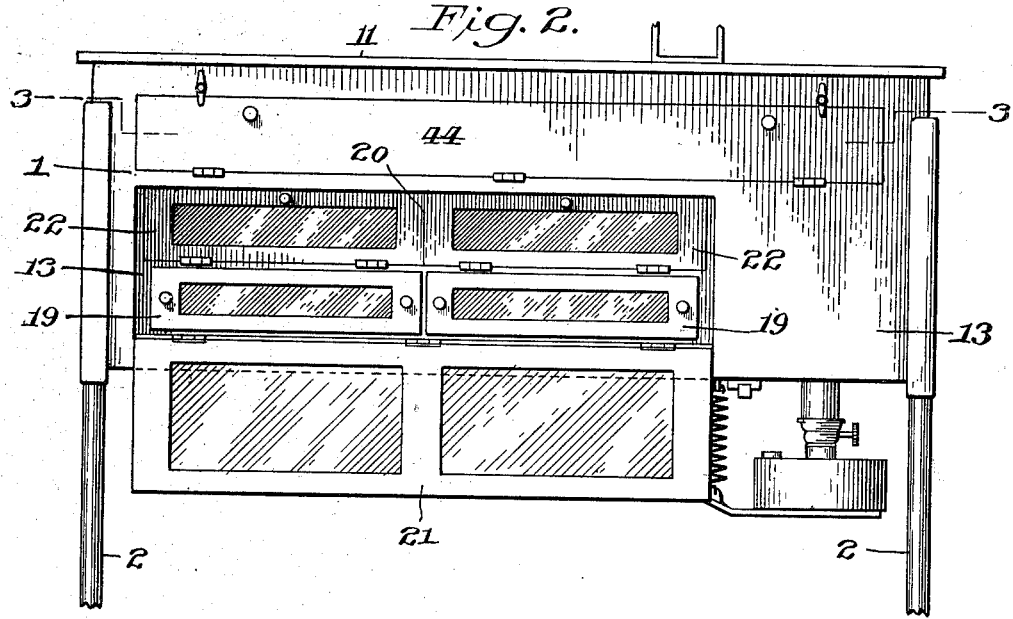
Figure 3:
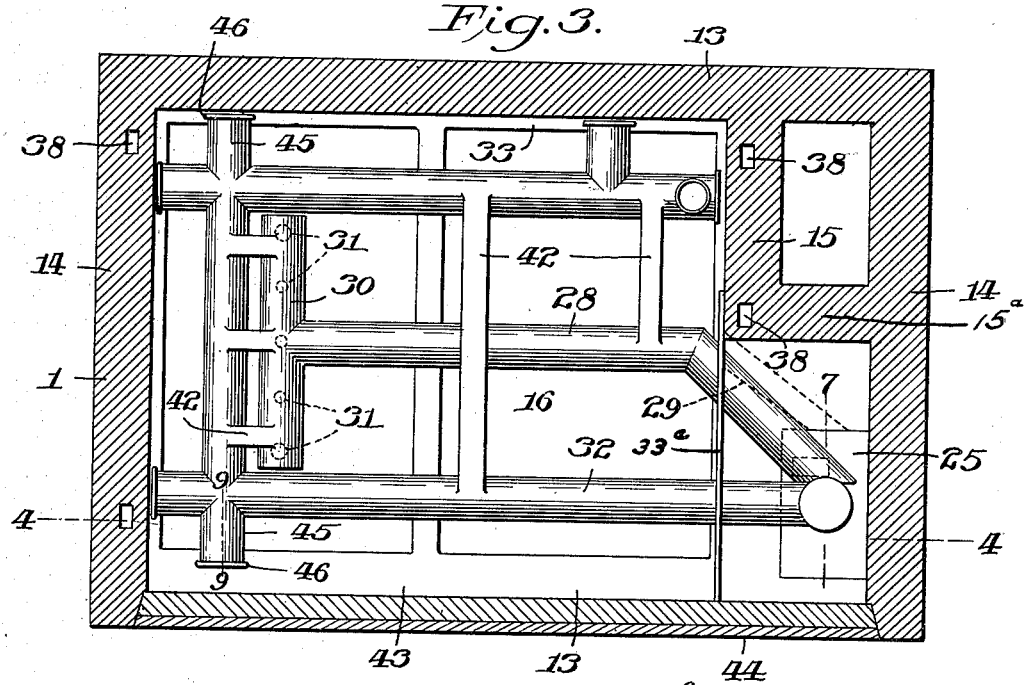
Figure 4:
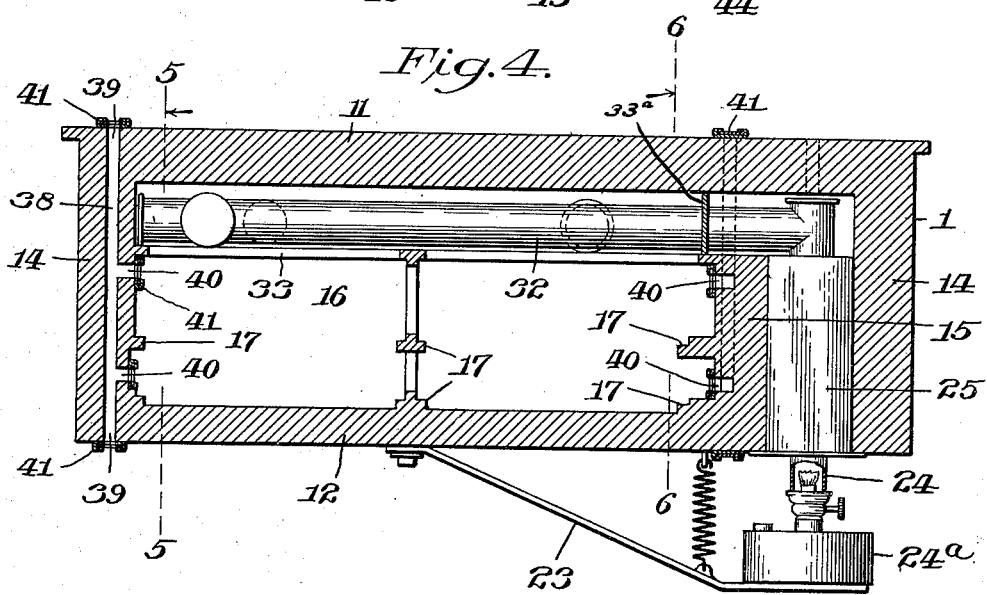

In the drawings, Figure 1 is a plan view of my improved incubator. Fig. 2 is a front elevation thereof, one of the doors being shown in the open position. Fig. 3 is a horizontal section as on the line 3 3 of Fig. 2. Fig. 4 is a vertical section as on the line 4 4 of Fig. 3. Fig. 5 is a vertical section as on the line 5 5 of Fig. 4, including the racks 18 and drawers 19. Fig. 6 is a vertical section as on the line 6 6 of Fig. 4. Fig. 7 is a vertical section through the air-heating chamber as on the line 7 7 of Fig. 3. Fig. 8 is a horizontal section thereof as on the line 8 8 of Fig. 7. Fig. 9 is a sectional detail as on the line 9 9 of Fig. 3.

Numeral 1 designates a suitable casing, and 2 the supporting-legs therefor. The casing in its preferred form comprises the top and bottom 11 and 12, respectively, the side walls 13, the end walls 14, and the inner transverse wall 15, the latter wall extending between the side walls 13 and being connected by a centrally-located extension 15ª with the adjacent end wall 14.

16 is the incubating-chamber, in which are arranged transverse rails 17, which support the egg-racks 18 and also the drawers 19 for the reception of the hatched birds.

The front wall 13, opposite the racks 18 and drawers 19, is cut away to afford a space 20, which is closed by a door 21. The wall 13, within the space 20 and directly in front of the racks 18 and drawers 19, is provided with openings for the admission of said racks and drawers to the incubating-chamber. The opening opposite the racks 18 is provided with doors 22, whereby the incubating-chamber is kept closed, and whereby also access may be readily had to the racks, the opening opposite the drawers 19 being closed by the front walls of said drawers. By this construction I am enabled to remove the hatched birds from the drawers 19 without opening the incubating-chamber in front of the egg-racks or to remove the egg-racks without opening said chamber in front of the drawers, thereby permitting free access to the egg-racks and drawers without liability of material change in the temperature of the incubating-chamber.

Supported by a bracket 23 is the heating device, usually a lamp 24ª, as shown, which communicates with the centrally-disposed pipe 24 of an air-heating chamber 25, which is fitted to an opening within one of the end walls 14, the inner wall 15, its extension 15ª, and the adjacent side wall 13, from which it may be readily removed for cleansing. This chamber in its preferred form comprises a rectangular casing, of sheet metal or any suitable material, which is divided into two compartments 26 27. The inner compartment 26 surrounds the pipe 24 and opens into a horizontally-disposed pipe 28, arranged above the egg-racks 18, and the outer compartment 27 surrounds the inner compartment 26 and is provided with openings 26ª, which communicate with the incubating-chamber by suitable passages 29, arranged in the wall 15 and extension 15ª. The pipe 28 extends through the center of the upper portion of the incubating-chamber and is provided with a transverse member 30, which is provided along its bottom with openings 31, through which warm air passes from the chamber 26 to the incubating-chamber 16. The pipe 24 is detachably fitted to and opens into a horizontal pipe 32, arranged on a ledge 33 above the egg-rack. This pipe 32 extends around the incubating-chamber and has direct connection with the lamp 24ª through the pipe 24. Fitted to the free end of the pipe 32 and extending upwardly therefrom through the casing is a vertical pipe 34, having an open end 35, which communicates with the external atmosphere. The open end 35 of this pipe 34 is controlled in the usual manner by a suitable thermostatic bar 36, arranged in the incubating-chamber, whereby the current of hot air passing from the lamp $24^a$ through the pipes 24 32 may be nicely regulated. The top of the wall 15 and extension $15^a$ is cut away above the air-heating chamber 25, as shown in Figs. 3 and 4, to afford a space for the passage of the pipes 28 and 32 to said chamber. This space is separated from the incubating-chamber by a plate $33^a$, through which the pipes 28 and 32 extend and which rests upon the ledge 33 of the wall 15. The fresh air enters the heating-chamber through passages 37, located in the bottom thereof, and after being heated in said chamber passes by way of the openings 29 and pipe 28 to the incubating-chamber. By this construction, plus the arrangement of the fresh-air passages in respect to the pipe 24, it will be seen that the air passing through the compartment 26 is heated to a greater degree than the air passing through the compartment 27 and that in view of the described location of the lamp $24^a$ and air-heating chamber 25 the temperature is increased of that portion of the incubating-chamber next adjacent said lamp and heating-chamber. Consequently the heated air is conducted from the compartment 26 through the pipe 28 to a point near the end of the incubating-chamber opposite the lamp $24^a$ and from the compartment 27 through the passages 29 to a point in the incubating-chamber adjacent said lamp. To permit the warm air to escape from the incubating-chamber and also to insure the proper ventilation of said chamber, I extend through the casing 1 a series of air-ducts 38, which communicate with the external atmosphere by openings 39 at the top and bottom of the casing and with the incubating-chamber 16 by openings 40, arranged near the respective corners of said chamber. The openings 39 and 40 are provided with slide-valves 41, by means of which the passage of air to and from the incubating-chamber may be regulated.

By the above-described arrangement of the air-passages and the radiation of heat from the pipe 32 I am enabled to maintain a uniform temperature in all parts of the incubating-chamber.

The pipes 28 and 32 are tied together by cross-bars 42, thereby forming an integral structure, which may be readily removed from the incubator through an opening 43 in the front wall 13 of the casing, said opening 43 being normally closed by a door 44. The pipe 32 is provided with extensions 45, which rest upon the ledge 33 when the pipe is in the incubator. The end of each of the extensions 45 is closed by a head 46, fitted thereto, which may be readily removed for cleansing the pipe 32.

I claim—

1. In an incubator the combination of a casing, a chamber therein, a heating device including two air-heating compartments one located within the other, said compartments communicating with said chamber and the external atmosphere, and air-escape ducts leading from said chamber.

2. In an incubator, the combination of a casing, a chamber therein, a heating device, a pipe leading therefrom and passing through said chamber, two compartments communicating with said chamber and the external atmosphere, one of said compartments being within the other and surrounding said pipe.

3. In an incubator, the combination of a casing, a chamber therein, a heating device arranged in said casing and including two separate fresh-air-heating compartments, air-passages for the respective compartments, communicating with said chamber, the points of communication of said passages with the chambers being near and away from said heating device, respectively, and air-escape ducts leading from said chamber.

4. In an incubator, the combination of a casing, a chamber therein, a heating device, a series of pipes arranged in said chamber and detachably connected to said heating device, said casing being provided with an opening to permit the removal of said pipes, and means for closing said opening.

5. In an incubator, the combination of a casing, a chamber therein, a heating device, a series of pipes forming an integral structure and connected with said device, and removable heads on said pipes.

6. In an incubator, the combination with a casing, a chamber therein, a heating device, means for introducing air from said device to said chamber, and air-passages extending through the casing and communicating with the external atmosphere at the top and bottom of said casing, said passages also communicating with the chamber.

7. In an incubator, the combination with a casing, a chamber therein, a heating device, means for introducing air from said device to said chamber, air-passages extending through the casing and communicating with the external atmosphere at the top and bottom of said casing, said passages also communicating with the chamber, and valves for regulating the passage of air through said passages.

In testimony whereof I affix my signature in presence of two witnesses.

PEDER PEDERSEN.

Witnesses:
 WALTER FIFIELD,
 F. EDGAR SMITH.